(12) United States Patent
Alberkrack et al.

(10) Patent No.: US 7,276,867 B2
(45) Date of Patent: Oct. 2, 2007

(54) CONTROLLER ARRANGEMENT WITH ADAPTIVE NON-OVERLAPPING COMMUTATION

(75) Inventors: Jade H. Alberkrack, Tempe, AZ (US); Robert Alan Brannen, Chandler, AZ (US)

(73) Assignee: Andigilog, Inc., Tempe, AZ (US)

( * ) Notice: Subject to any disclaimer, the term of this patent is extended or adjusted under 35 U.S.C. 154(b) by 365 days.

(21) Appl. No.: 11/080,344

(22) Filed: Mar. 15, 2005

(65) Prior Publication Data

US 2006/0097678 A1      May 11, 2006

Related U.S. Application Data

(63) Continuation-in-part of application No. 10/985,754, filed on Nov. 10, 2004, now Pat. No. 7,030,584.

(51) Int. Cl.
    *H02P 1/18* (2006.01)
(52) U.S. Cl. ............... 318/254; 318/138; 318/439; 318/599; 388/800; 388/804; 388/811

(58) Field of Classification Search ............... 318/254, 318/138, 439, 533; 388/800, 804, 811
See application file for complete search history.

(56) References Cited

U.S. PATENT DOCUMENTS

| | | | | |
|---|---|---|---|---|
| 4,434,389 A | * | 2/1984 | Langley et al. | 318/254 |
| 4,859,921 A | * | 8/1989 | Archer | 318/599 |
| 5,306,988 A | * | 4/1994 | Carobolante et al. | 318/254 |
| 5,668,449 A | * | 9/1997 | Carobolante | 318/254 |
| 6,661,190 B1 | * | 12/2003 | Atmur | 318/254 |

* cited by examiner

*Primary Examiner*—Rina Duda
(74) *Attorney, Agent, or Firm*—Donald J. Lenkszus

(57) ABSTRACT

A PWM controller for a direct current brushless motor comprising first and second windings includes a motor drive circuit receiving pulse width modulation control signals to drive the first and the second windings; and a control circuit having inputs coupled to the first and second windings to control a pulse width modulation control circuit such that pulse width modulated control signals are provided to the motor drive circuit only when the voltage across the first and second windings are at a predetermined level.

19 Claims, 5 Drawing Sheets

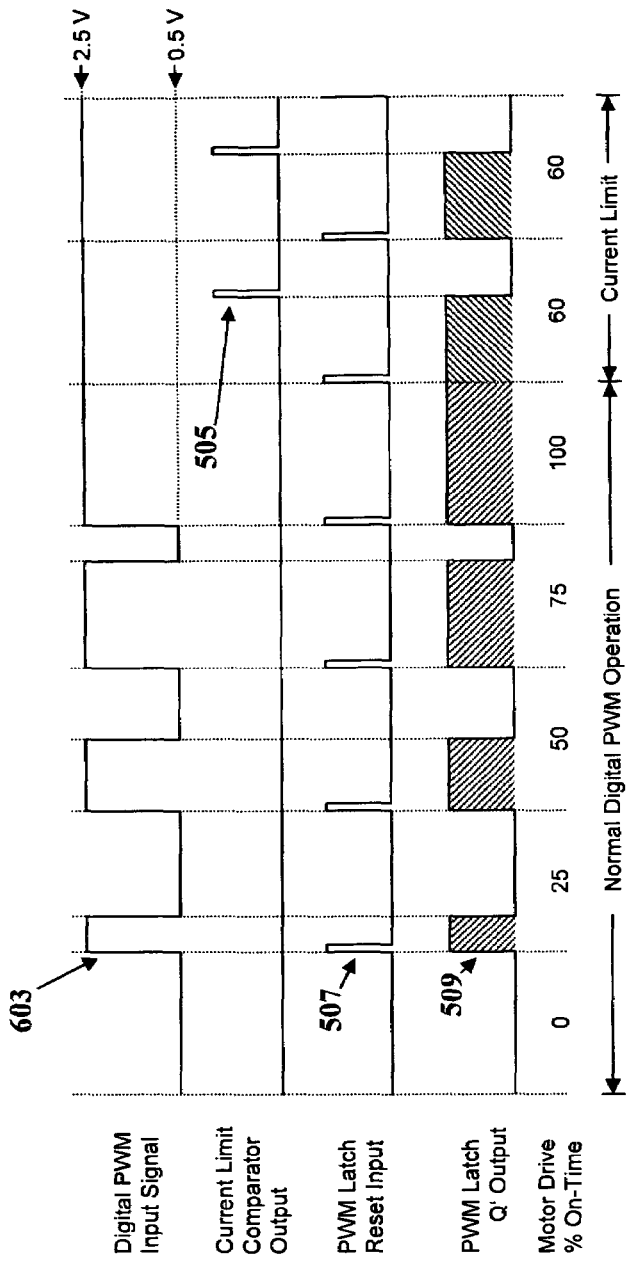
FIG. 6
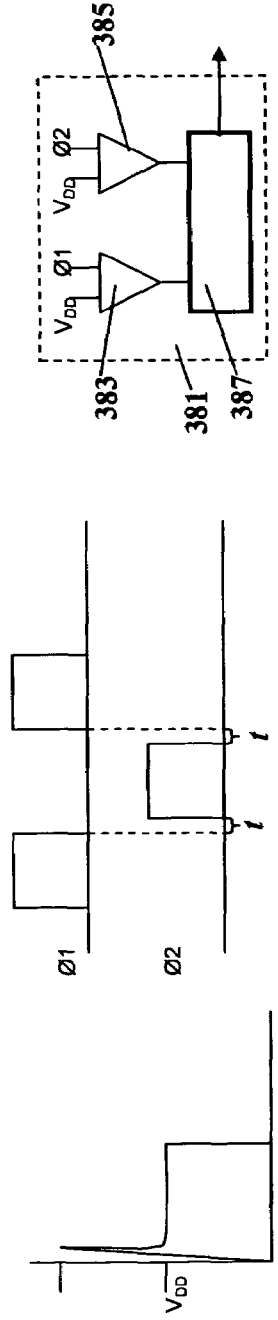
FIG. 9
FIG. 8
FIG. 7

CONTROLLER ARRANGEMENT WITH ADAPTIVE NON-OVERLAPPING COMMUTATION

RELATED APPLICATIONS

This application is a continuation-in-part of prior U.S. patent application Ser. No. 10/985,754 filed Nov. 10, 2004 now U.S. Pat. 7,030,584 which is assigned to a common assignee.

FIELD OF THE INVENTION

The invention pertains to motor controllers, in general, and to a control arrangement for a brushless direct current motor, in particular.

BACKGROUND OF THE INVENTION

One problem with operation of brushless direct current motors of the type that are commonly used to provide electronic equipment cooling is that the leakage inductance between the motor windings may produce significant leakage inductance voltage spikes on the drive transistors. Also overlapping commutation results in current spikes on the motor power source.

Unless controlled or suppressed, the leakage inductance voltage and overlapping commutation current spikes may produce significant electromagnetic interference effects in associated electronic circuitry. In the past, suppression circuitry has been utilized to minimize the effect of leakage inductance spikes.

A significant disadvantage to the prior approach of suppression is that the suppression utilizes capacitors, either bypass capacitors or cross coupling capacitors across the motor windings. This is a disadvantage because the use of any component that can not be integrated onto an integrated circuit leads to extra cost and physical space requirements.

It is therefore desirable to provide a motor controller circuit that reduces the required capacitance to suppress leakage inductance and overlapping commutation spikes.

SUMMARY OF THE INVENTION

A PWM controller for a direct current brushless motor comprising first and second windings includes a motor drive circuit receiving pulse width modulation control signals to drive the first and the second windings; and a control circuit having inputs coupled to the first and second windings to control a pulse width modulation control circuit such that pulse width modulated control signals are provided to the motor drive circuit only when the voltage across the first and second windings are at a predetermined level.

A motor control circuit for a brushless direct current motor comprising first and second windings in accordance with the principles of the invention comprises a motor drive control circuit and a commutation circuit. The motor drive control circuit is coupled to the first and the second windings. The commutation circuit controls the drive circuit such that the drive circuit does not apply power to the second winding until a first predetermined condition occurs, and such that the drive circuit does not apply power to the first winding until a second predetermined condition occurs.

In accordance with one aspect of the invention, the first predetermined condition is that the voltage across the first winding is at a first predetermined level.

In accordance with another aspect of the invention, the second predetermined condition is that the voltage across the second winding is at a second predetermined level.

In accordance with yet another aspect of the invention, the first predetermined level is the same as the second predetermined level.

In accordance with another aspect of the invention, the first predetermined level and the second predetermined level is equal to or less than the motor supply voltage.

In accordance with one aspect of the invention, the first predetermined condition is that a first predetermined time interval occurs after the trailing edge of an energization pulse applied to the first winding. The second predetermined condition is that a second predetermined time interval occurs after the trailing edge of an energization pulse applied to the second winding.

In one illustrative embodiment of the invention the first predetermined time interval and the second predetermined time interval are substantially the same and are each selected to be within the range of 10 μsec. to 200 μsec.

A method of operating a brushless direct current motor comprising first and second windings in accordance with the invention comprises providing a motor drive circuit coupled to the first and second windings for providing drive power thereto; providing a commutation circuit coupled to the drive circuit; operating the commutation circuit such that the drive circuit does not apply power to the second winding until a first predetermined condition occurs; and operating the commutation circuit such that the drive circuit does not apply power to the first winding until a second predetermined condition occurs.

In accordance with one aspect of the invention the method includes selecting the first predetermined condition to be the voltage across the first winding being at a first predetermined level. The method further includes selecting the second predetermined condition to be the voltage across the second winding being at a second predetermined level.

Another aspect of the method of the invention includes selecting the first predetermined level to be the same as the second predetermined level.

In accordance with yet another aspect of the invention, the method includes selecting the first predetermined condition to be a first predetermined time interval occurring after the trailing edge of an energization pulse applied to the first winding; and selecting the second predetermined condition to be a second predetermined time interval occurring after the trailing edge of an energization pulse applied to the second winding.

In one embodiment of the invention, the method includes selecting the first predetermined time interval and the second predetermined time interval to be substantially the same and within the range of 10 μsec. to 200 μsec.

In the illustrative embodiment of the invention, a PWM controller for a direct current brushless motor comprising first and second windings has an input terminal for receiving an analog control signal and a digital control signal. A pulse width modulation control circuit is coupled to the input terminal. The control circuit is responsive to digital input signals and to analog input signals at the input terminal to provide pulse width modulated control signals. A motor drive circuit is coupled to the pulse width modulation control circuit and to the first and the second windings. The control circuit has inputs coupled to the first and the second windings to control the pulse width modulation control circuit such that pulse width modulated control signals are provided to the motor drive circuit only when the voltage across the first and the second windings are at a predetermined level.

BRIEF DESCRIPTION OF THE DRAWING

The invention will be better understood from a reading of the following detailed description of the drawing in which like reference designators are used to identify like elements in the various drawing figures, and in which;

FIGS. 5 and 6 illustrates detailed waveforms;

FIG. 7 is a waveform of the voltage across one of the motor windings before adding the improvement of the invention;

FIGS. 8 and 10 illustrate the voltages applied to the motor windings in accordance with the principles of the invention; and FIG. 9 illustrates a portion of the block diagram of FIG. 3 in greater detail.

DETAILED DESCRIPTION

Figure 1:
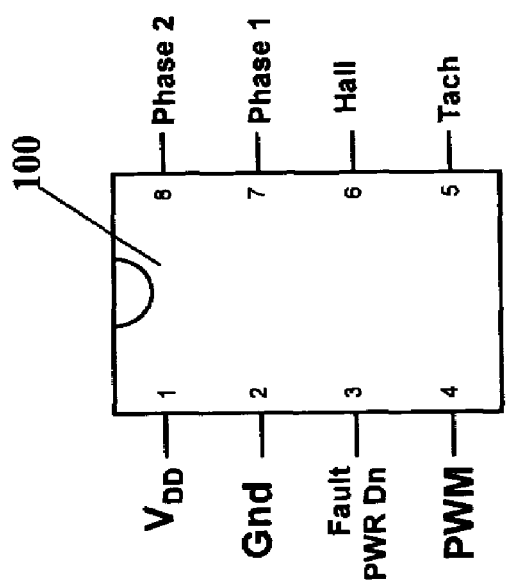
FIG. 1 is a representation of a device in accordance with the principles of the invention.

The illustrative embodiment of the invention is a monolithic brushless DC motor controller 100 that provides functions for implementing fan speed control. As shown in FIG. 1, the invention may be implemented in one configuration as an eight pin package.

Controller 100 may be provided in SOP-8 and MSOP-8 surface mount packages. In other embodiments of the invention controller 100 may be integrated onto the same silicon as the device being cooled by fan 200.

Figure 2:
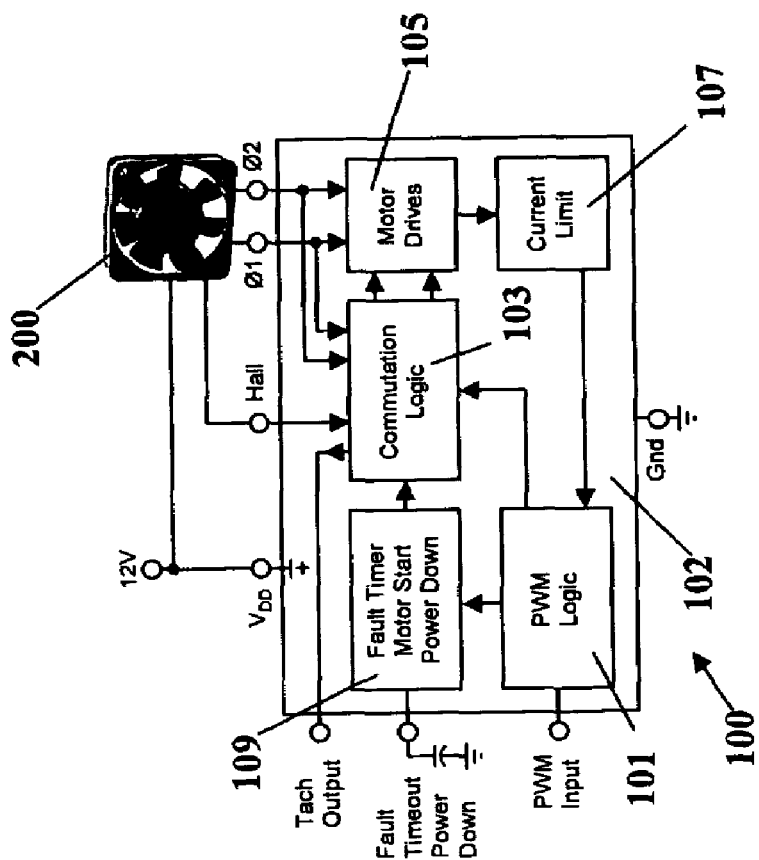
FIG. 2 illustrates the device of FIG. 1 connected to a cooling fan.

Turning now to FIG. 2, controller 100 for speed control of motor 200 includes a pulse width modulator logic or PWM circuit 101, commutation logic for proper drive sequencing 103, direct motor drive 105, current limiter 107, and a programmable fault timer with time delayed restart and a power down low current mode block 109.

Figure 3:
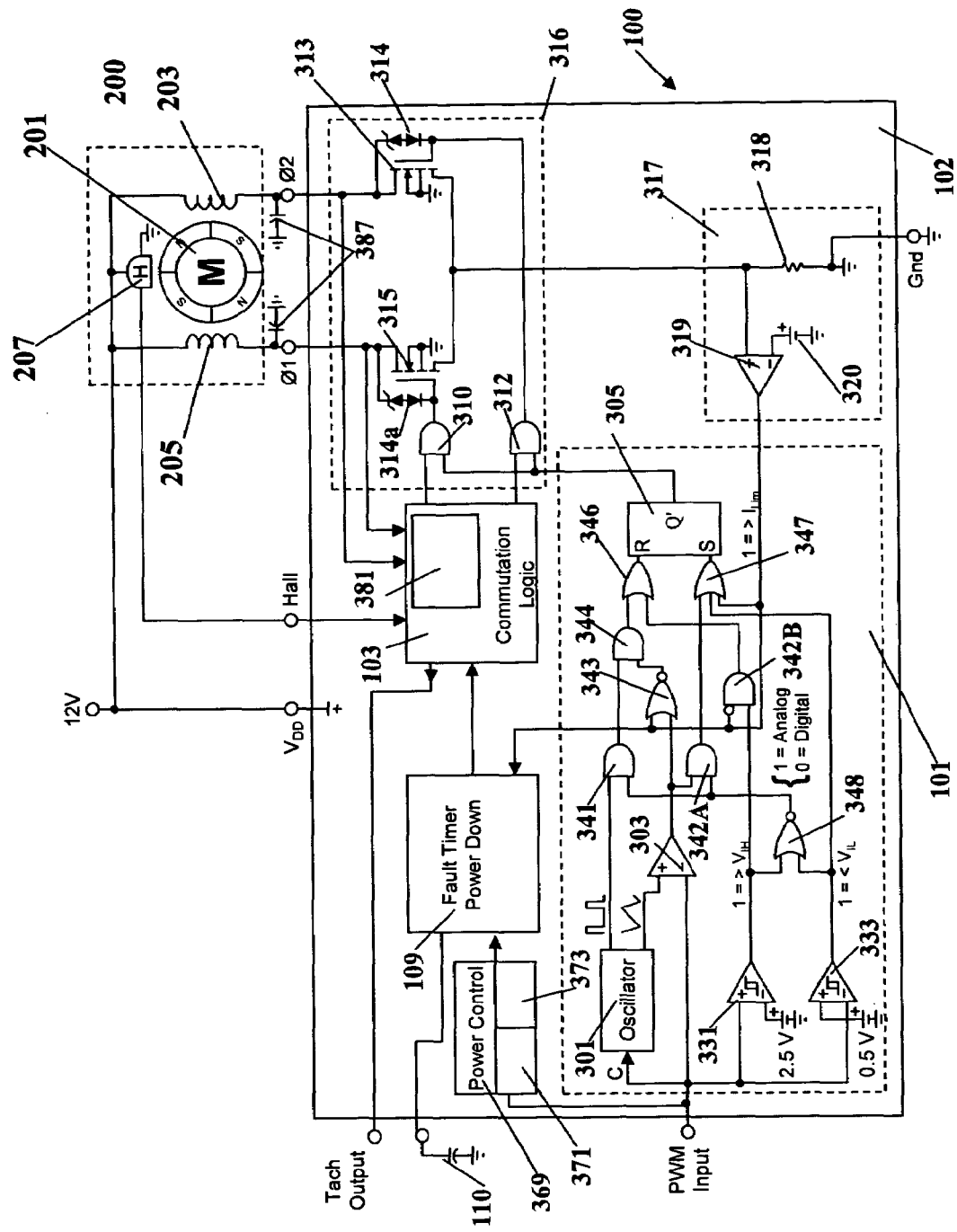
FIG. 3 is a detailed block diagram of the device of FIG. 1.

Controller 100, fully integrated on a single chip 102 contains all required functions for implementing fan speed control. As shown in FIG. 3, pulse width modulator (PWM) 101 comprising a fixed frequency oscillator 301, comparator 303, and a latch 305 along with associated gates for motor speed control of motor 200. Controller 100 also includes commutation logic 103 for proper drive sequencing, on-chip power MOSFETs 313, 315 for direct motor drive, cycle-by-cycle current limiting circuit 317, and a circuit block 319 providing a programmable fault timer with time delayed restart, and a power down low current mode.

Motor 200 includes rotor 201 and stator windings 203, 205. A rotator position sensor 207 is provided with motor 200. In a typical motor fan arrangement, a Hall effect device sensor is utilized is utilized as sensor 207. Motor 200 includes connections Ø1, Ø2, a sensor output HALL and power connections.

Controller 100 utilizes pulse width modulation to provide an energy efficient means for controlling the motor speed of fan motor 200 by varying the average applied voltage to each stator winding 203, 205 during the commutation sequence.

PWM circuit 101 as noted above includes oscillator 301, comparator 303, and latch 305. Oscillator 301 provides both pulse and saw tooth outputs. PWM circuit 101 is responsive to either an analog or a digital signal on the same input terminal PWM Input.

Figure 4:
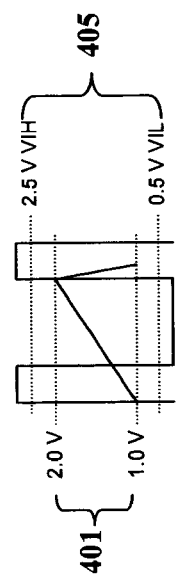
FIG. 4 illustrates input waveforms to the device of FIG. 1.

FIG. 4 illustrates the analog input signal range 401 and a digital input signal range 405 that PWM logic 101 is responsive to in the illustrative embodiment are shown.

PWM circuit 101 includes a sub-circuit comprising level comparators 331, 333 and a NOR gate 348 that is used to determine whether the control signal at terminal PWM Input is a digital control signal. If the control signal is not digital, it is assumed to be analog.

Comparator 331 has an input coupled to terminal PWM Input and compares the voltage at PWM Input against a reference that corresponds to the minimum logic high level. In this embodiment, the minimum logic high voltage level is 2.5 volts. Comparator 331 generates a logic 1 or high output if the voltage at PWM Input exceeds 2.5 volts.

Comparator 333 has an input coupled to terminal PWM Input and compares the voltage at PWM Input against a reference that corresponds to the maximum logic low level. In this embodiment, the maximum logic low voltage level is 0.5 volts. Comparator 333 generates a logic 1 or high output if the voltage at PWM Input is less than 0.5 volts.

Nor gate 348 provides a logic 0 or low output if either comparator 331 or comparator 333 indicates that the control signal is digital and provides a logic 1 or high output if neither comparator 331 or 333 indicates that the control signal is a digital signal.

Operation of gates 341-348 is as follows: AND gate 341 has one input coupled to the square wave output of oscillator 301 and its other input coupled to the output of gate 348. Gate 341 blocks pulses from Oscillator 301 if a digital signal is present at PWM Input. This prevents Oscillator 301 from initiating operation of Motor Drive circuit 316 via latch 305 when a digital signal is present at PWM Input.

AND gate 342 has one input coupled to the output of PWM comparator 303 and its other input coupled to the output of gate 348. Gate 342 blocks the PWM comparator output pulses if a digital signal is present at PWM Input. This prevents PWM comparator 303 from terminating operation of Motor Drive circuit 316 via latch 305 when a digital signal is present at PWM Input.

Gate 343 is used to block signals to latch 305 reset input R during the time that current limiter 317 detects that the motor current exceeds a predetermined limit. This prevents PWM comparator 303 from initiating energization of motor drive circuit 316.

Gate 344 allows the pulse output from Oscillator 301 to reset latch 305 if there is no current limiting and no analog input control signal comparison from comparator 303.

Gate 347 is used to terminate energization of motor drive circuit 316 from either a digital low PWM INPUT signal, or a comparison from comparator 303, or the current limiter circuit 317 detects that the drive current limit is exceeded.

Gate 346 is utilized to reset latch 305 to initiate on-time of motor drive circuit 316. Gate 347 sets latch 305 to terminate the on-time of motor drive circuit 316.

Figure 5:
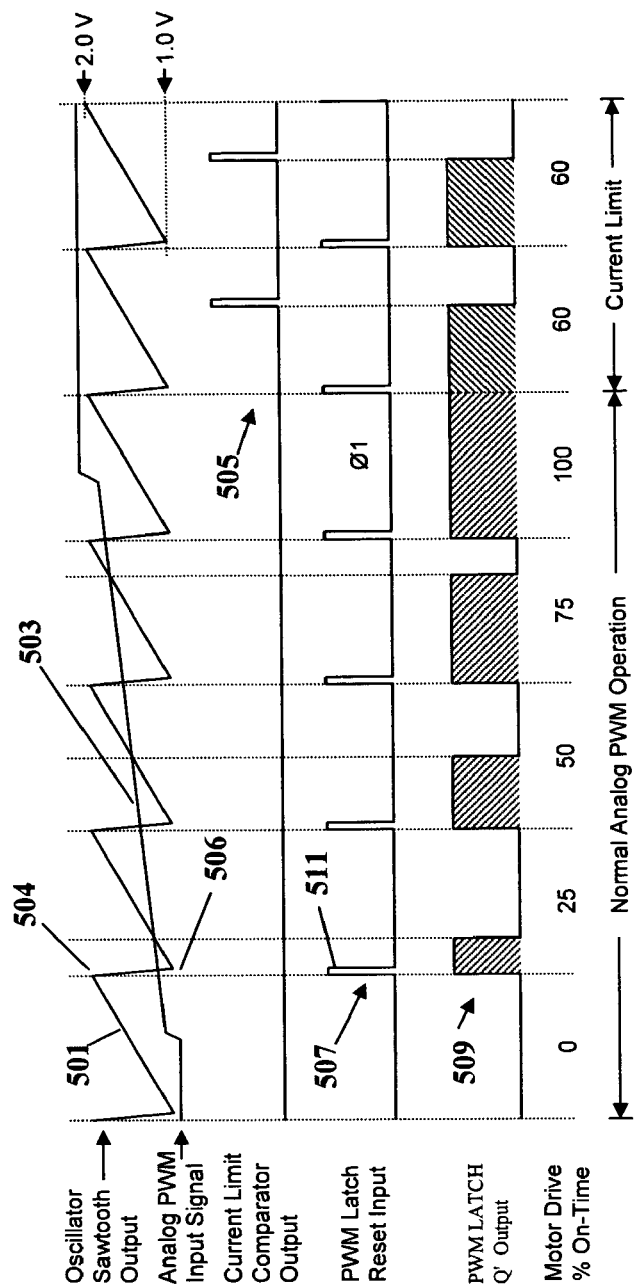

Operation of PWM circuit 101 in response to analog input control signals may be better understood by referring to the waveforms of FIG. 5. Waveform 501 is the saw tooth output waveform of Oscillator 301. Waveform 503 is the Analog signal control at PWM Input. Waveform 505 is the output of current limit circuit 317. Waveform 507 is the reset input R of PWM latch 305. Waveform 509 is the output Q' of PWM latch 305.

Analog signal input control is accomplished with Oscillator 301 initiating Motor Drive conduction and the PWM Comparator 303 terminating it. As the voltage of saw tooth output waveform 501 falls from its peak level 504 to valley level 506 (2.0 V to 1.0 V, respectively), a pulse 511 is simultaneously generated at the oscillator output 507 to reset PWM Latch 305, thereby causing the output Q' to attain a high level allowing conduction of a Motor Drive MOSFET 313, 315. PWM Comparator 303 terminates conduction when saw tooth waveform 501 rises above the voltage level of the analog control waveform 503 applied to PWM Input. Thus, the conduction duty cycle or average voltage applied to a stator winding 203, 205 of fan motor 200 is directly controlled by the analog voltage at PWM Input. The conduction duty cycle increases from 0% to 100% as illustrated by waveform 509 as PWM Input voltage increases from 1.0 V to 2.0 V, respectively.

Operation of PWM logic 101 in response to digital control signals at PWM Input may be better understood by referring to the waveforms of FIG. 6. Waveform 603 is a representative waveform of an input digital signal control at PWM Input. Waveform 505 is the output of current limit comparator 317. Waveform 507 is the reset input R of PWM latch 305. Waveform 509 is the output Q' of PWM latch 305.

Digital control is accomplished by applying a digital signal of the desired conduction duty cycle to the PWM Input. As shown in FIG. 4, the low VIL and high VIH states for the digital input encompass the internal saw tooth peak and valley levels. In the illustrative embodiment, saw tooth levels are chosen such that a maximum 0.5 V low state and a minimum 2.5 V high state digital signal are utilized. These levels are easily achievable by 3.0 V logic circuitry.

Latch 305 when reset, initiates conduction of a Motor Drive MOSFET 313, 315. Latch 305 when set, terminates conduction of Motor Drive MOSFETs 313, 315. Thus, the conduction duty cycle is directly controlled by the signal duty cycle present at the PWM Input as long as the signal magnitude is above and below the window detector thresholds provided by comparators 331, 333.

Commutation logic 103 includes a rotor position decoder coupled to HALL input to monitor which in turn is connectable to Hall sensor 207. Rotor position decoder provides proper sequencing of the Phase 1, φ1, and Phase 2, φ2 drive outputs. Hall input is designed to interface directly with an open collector type Hall Effect switch. An internal pull-up is provided to minimize to number of external components. The Commutation Logic provides an output signal for monitoring the motor speed at output Tach.

Direct motor drive is accomplished by providing two on-chip open drain N-channel MOSFETs 313, 315, each having a high breakdown voltage. The respective MOSFET 313, 315 drains are pinned out to output terminals φ1, φ2 for direct connection to motor windings 203, 205. Zener and series diodes 314, 314a are connected from each respective MOSFET drain to gate to protect the MOSFETs 313, 315 from excessive inductive voltage spikes.

Current limit comparator 317 monitors the voltage drop that appears across a sense resistor 318. If motor 201 becomes overloaded or stalls, the threshold level of current limit circuit 317 will be exceeded causing PWM Latch 305 to set. This terminates conduction of the Motor Drive MOSFETs 313, 315 on an oscillator cycle-by-cycle basis.

The Fault Timer 109 is controlled by the value of the external capacitor 110. A current source included in fault timer 109 is used to charge capacitor 110.

The Fault Time mode is initiated when the current limit circuit 317 is activated. If an over current situation persists for an extended time period, the Fault Timer will gradually discharge the external timing capacitor to a voltage level that will cause the motor to stop and then initiate a restart sequence.

A power control circuit 369 is connected to the PWM input terminal. Power control circuit 369 monitors the signal level at PWM input. If the signal level at PWM input is below the minimum signal level for both digital and analog control signals for a predetermined time, power control circuit 369 signals circuit 109 to enter the power down or "sleep" mode wherein, power drain is reduced. This advantageously eliminates the need to provide separate power down control signals. Operation of the power control circuit is automatic. Power control circuit thus automatically reduces in device drain current at zero fan speed after time out.

Stated another way power control circuit 369 automatically powers down control circuit 100 if the system is at zero fan speed for a predetermined time.

If the signal level at PWM input is less than one volt, the fan is stopped and a timer in power control circuit 369 initiates a time period. If the signal level at PWM input rises to one volt or above, then the timer is turned off. The timer is set so that the predetermined time period selected is greater than the time period between pulses of the digital control signal. In the embodiment shown, a time period of two seconds is utilized as the predetermined period of time. However, those skilled in the art will understand that other time periods may be utilized.

If at any time the signal level at PWM input rises to the first level or above, the timer is reset and control circuit 100 is fully powered up.

Although those skilled in the art are aware that many circuit configurations can be provided for power control circuit 369. In the illustrative embodiment, a level comparator 371 and a timer 373 are utilized to provide the power control function.

Motor winding leakage inductance is due to the relatively poor or low mutual coupling between the phase 1 and phase 2 windings 205, 203. A high voltage turn-off spike is generated by the energy that was stored in the leakage inductance during the on-time. This energy must be absorbed to prevent destruction of the motor drive MOSFETs 315, 314. This is usually accomplished with the addition of a capacitive snubber circuit 387. Capacitive snubbing will extend the turn-off voltage rise time.

FIG. 7 illustrates this problem that occurs in prior art motor controllers. Because of the low mutual coupling that exists between the motor windings 203, 205, a significant leakage inductance spike will typically occur each time one of the windings is de-energized. This problem manifests itself in a spike at the leading edge of the pulsed motor winding and may exceed twice the magnitude of the supply voltage $V_{DD}$ that is applied to the motor windings 203, 205.

Turning on phase 2 winding 203 early (before the current decays in phase 1) tends to reduce the leakage inductance voltage spike but at the expense of creating a current spike in the motor power source $V_{DD}$.

In accordance with the principles of the invention, the energization of each winding 203, 205 is delayed by a time t as shown in FIG. 8 so that the leakage inductance voltage is significantly less than the applied voltage $V_{DD}$. Typically the delay time t is in the range of 10 to 200 microseconds. The delay time t is proportional to the inductance of windings 203, 205.

For the highest efficiency and the lowest $V_{DD}$ current spike, the optimum time to turn-on phase 2 winding 203 is after the current has decayed in phase 1 winding 205. The problem is that this time is variable depending upon the motor leakage inductance, winding mutual coupling, and snubber capacitance 387 used.

The optimum time to turn-on phase 2 winding 203 is determined by monitoring the voltage on phase 1 winding 205. By delaying the turn-on of phase 2 winding 203 until the voltage at phase 1 winding 205 has risen to a level that is slightly less than $V_{DD}$, the current spike induced in $V_{DD}$ is reduced significantly, thus reducing EMI and RFI. In this manner, the commutation delay becomes automatically adaptive to the motor characteristics and the snubber circuit 387.

A representative circuit 381 included in the commutation circuit 103 for delaying application of pulses to drive circuit 316 is shown in FIG. 9. Voltage threshold circuits 383 and 385 are coupled across motor windings 205, 203, respectively. Voltage threshold circuits 383, 385 each monitor the voltage across the respective winding and each provides an output that is coupled to delay circuit 387 that controls commutation circuit 103 such that the turn on falling edge of each pulse applied to one winding is delayed by the time t that occurs after the turn off rising edge of the pulse applied to the other winding.

The adaptive non-overlapping commutation delay circuit 381 prevents simultaneous drive conduction for reduced power supply current spikes and radio frequency interference (RFI). The non-overlap time t is internally set to a minimum of 20 μs. Circuit 381 monitors the rise in turn-off voltage at each drive output φ1, φ2 and dynamically extends time t. The voltage level at the initially turned off output must reach $V_{DD}$ before turn on of the next output is allowed.

Figure 10:
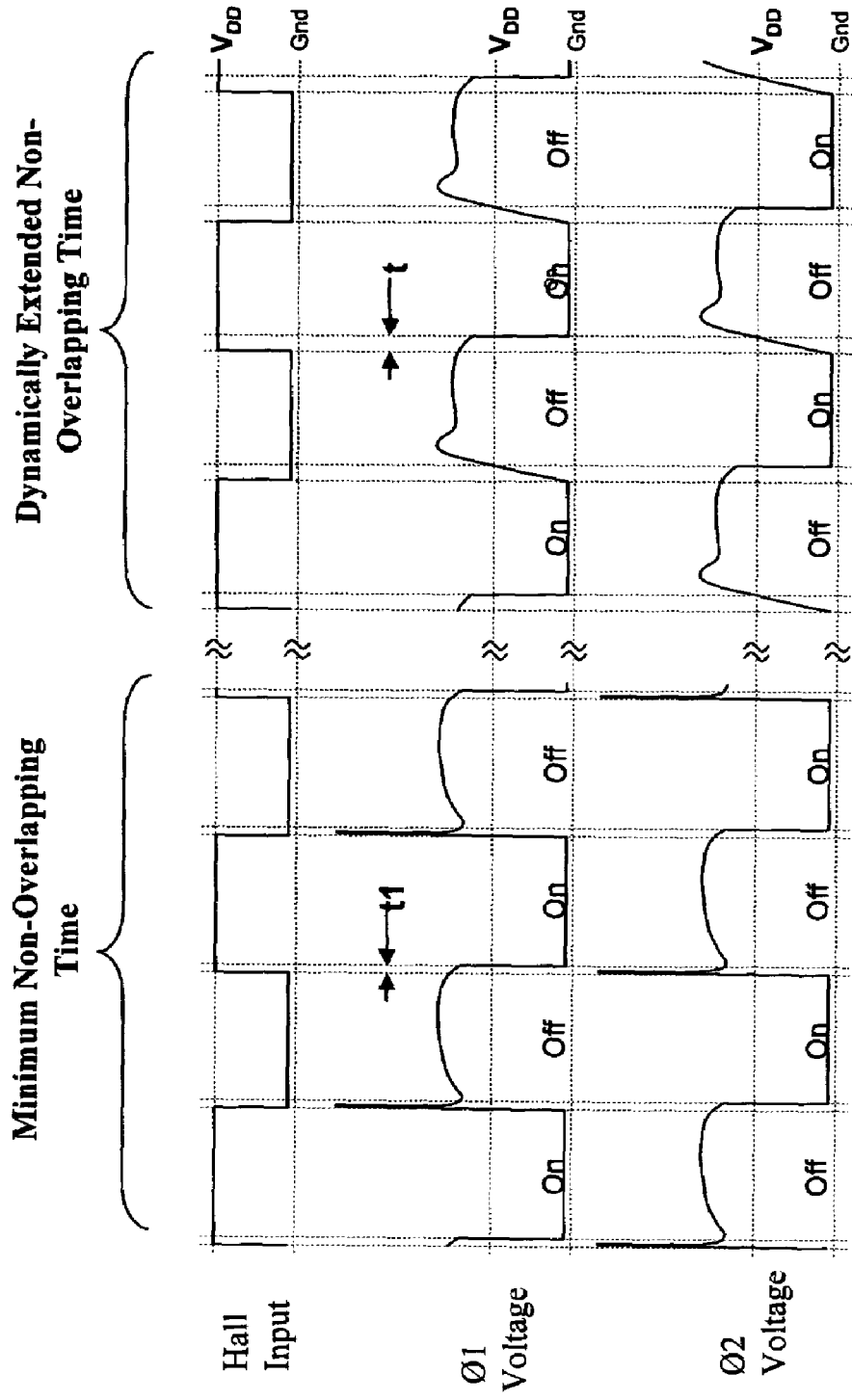

Turning now to FIG. 10, commutation waveforms are shown for the instance where there is a minimum or overlapping time t1 and for the instance where there is a delay time t. The adaptive delay time t is automatic and insures non-overlapping commutation even when large value snubber capacitors 387 are used.

Adaptive non-overlapping commutation delay circuit 381 prevents simultaneous drive conduction as shown in the waveforms on the left side of FIG. 10 which produce power supply current spikes and resulting radio frequency interference (RFI). Circuit 381 provides for a preset minimum non-overlap time of 20 μs. Circuit 381 operates to dynamically extend the non-overlap time by monitoring the rise in turn-off voltage at each drive output. The voltage level at the initially turned off output must reach $V_{DD}$ before turn on of the next output is allowed. The adaptive delay time t is automatic and insures non-overlapping commutation even when large value snubber capacitors 387 are used.

Advantageously, circuit 381 is formed on the same integrated circuit 100 that the rest of the controller circuit is formed on.

Controller 100 advantageously provides the following and other features:
  Interfaces directly with aSC7611 thermal controller;
  Analog and digital PWM control signal compatibility;
  Motor fault timeout with auto start retry;
  Fan tachometer output for closed loop speed control;
  Latching PWM for enhanced noise immunity;
  Cycle-by-cycle current limit protection;
  On-chip 1 Ohm motor drivers;
  Automatically initiated Low current power down mode;
  Minimum number of external components; and
  8-lead SOIC or MSOP package Controller 100 has many applications, including:
  Personal and notebook computers fans;
  Workstation and mainframe fans;
  LAN server blowers;
  Industrial control system fans;
  Telcom system fans;
  Instrumentation test and measurement fans; and
  Card rack fans.

The invention has been described in conjunction with a specific illustrative embodiment. It will be understood by those skilled in the art that various changes, substitutions and modifications may be made without departing from the spirit or scope of the invention. It is intended that all such changes, substitutions and modifications be included in the scope of the invention. It is not intended that the invention be limited to the illustrative embodiment shown and described herein. It is intended that the invention be limited only by the claims appended hereto, giving the claims the broadest possible scope and coverage permitted under the law.

What is claimed is:

1. A motor control circuit for a brushless direct current motor comprising first and second windings, said motor control circuit comprising:
  a motor drive circuit coupled to said first and said second windings; and
  a commutation circuit coupled to said motor and to said drive circuit;
  said commutation circuit controlling said drive circuit to apply power from a power source to said first and said second windings, said commutation circuit controlling said drive circuit such that said drive circuit applies supply voltage from said power source to said second winding only after a first predetermined condition occurs, and such that said drive circuit applies power to said first winding only after a second predetermined condition occurs, said first predetermined condition being selected such that leakage inductance voltage induced into said second winding when said first winding is de-energized is less than said supply voltage and whereby current spikes induced into said power source are reduced, and said second predetermined condition is selected such that leakage inductance voltage induced into said first winding when said second winding is de-energized is less than said supply voltage and whereby that current spikes induced into said power source are reduced.

2. A motor control circuit in accordance with claim 1, wherein:
  said first predetermined condition is that the voltage across said first winding is at a first predetermined level.

3. A motor control circuit in accordance with claim 2, wherein:
  said second predetermined condition is that the voltage across said second winding is at a second predetermined level.

4. A motor control circuit in accordance with claim 3, wherein:
  said first predetermined level is the same as said second predetermined level.

5. A motor control circuit in accordance with claim 4, wherein:
  said first predetermined level and said second predetermined level is equal to or less than the motor supply voltage.

6. A motor control circuit in accordance with claim 1, wherein:
said first predetermined condition is that a first predetermined time interval occurs after a predetermined one edge of the leading edge or the trailing edge of an energization pulse applied to said first winding.

7. A motor control circuit in accordance with claim 6, wherein:
said second predetermined condition is that a second predetermined time interval occurs after the predetermined one edge of an energization pulse applied to said second winding.

8. A motor control circuit in accordance with claim 7, wherein:
said first predetermined time interval and said second predetermined time interval are substantially the same.

9. A motor control circuit in accordance with claim 8, wherein:
said first and said second time intervals are each selected to be within the range of 10 μsec. to 200 μsec.

10. A method of operating a brushless direct current motor comprising first and second windings said method comprising:
providing a motor drive circuit coupled to said first and second windings and to a power source for providing drive power thereto at a supply voltage;
providing a commutation circuit coupled to said drive circuit;
operating said commutation circuit such that said drive circuit delays applying said supply voltage to said second winding until a first predetermined condition occurs;
operating said commutation circuit such that said drive circuit delays applying said supply voltage to said first winding until a second predetermined condition occurs; and
selecting said first predetermined condition to be one of the voltage across said first winding being at a first predetermined level below said supply voltage or a first predetermined time interval occurring after the trailing edge of an energization pulse applied to said first winding, such that leakage inductance voltage induced into said second winding when said first winding is de-energized is less than said supply voltage and whereby that current spikes induced into said power source are reduced.

11. A method in accordance with claim 10, comprising:
selecting said second predetermined condition to be the voltage across said second winding being at a second predetermined level, such that leakage inductance voltage induced into said first winding when said second winding is de-energized is less than said supply voltage and whereby that current spikes induced into said power source are reduced.

12. A method in accordance with claim 11, comprising:
selecting said first predetermined level to be the same as said second predetermined level.

13. A method in accordance with claim 10, comprising:
selecting said first predetermined condition to be a first predetermined time interval occurring after the trailing edge of an energization pulse applied to said first winding.

14. A method in accordance with claim 13, comprising:
selecting said second predetermined condition to be a second predetermined time interval occurring after the trailing edge of an energization pulse applied to said second winding.

15. A method in accordance with claim 13, comprising:
selecting said first predetermined time interval and said second predetermined time interval to be substantially the same.

16. A method in accordance with claim 15, comprising:
selecting said first and said second time intervals to each be within the range of 70 μsec. to 200 μsec.

17. A method of controlling a brushless direct current motor comprising first and second windings, said method comprising:
providing an input terminal;
providing a pulse width modulated control signal generator circuit responsive to input signals at said input terminal
providing a motor drive circuit to energize first and second windings of a brushless direct current motor in response to said pulse width modulated control signal generator;
operating said motor drive circuit such that it does not apply power to said second winding until a first predetermined condition occurs; and
operating said motor drive circuit such that it does not apply power to said first winding until a second predetermined condition occurs;
said first predetermined condition being selected such that leakage inductance voltage induced into said second winding when said first winding is de-energized is less than said supply voltage and whereby current spikes induced into said power source are reduced and said second predetermined condition is selected such that leakage inductance voltage induced into said first winding when said second winding is de-energized is less than said supply voltage and whereby that current spikes induced into said power source are reduced.

18. A method in accordance with claim 17, comprising:
providing a single integrated circuit having formed thereon said input terminal, said pulse width modulated control signal generator circuit, and said motor drive circuit.

19. A PWM controller for a direct current brushless motor comprising first and second windings, said controller comprising:
a single input terminal for receiving an analog control signal and a digital control signal;
a pulse width modulation control circuit coupled to said single input terminal, said control circuit being responsive to said digital control signal and to said analog control signal at said single input terminal to provide pulse width modulated control signals;
a motor drive circuit coupled to said pulse width modulation control circuit and to said first and said second windings; and
a control circuit having inputs coupled to said first and said second windings to control said pulse width modulation control circuit such that pulse width modulated control signals are provided to said motor drive circuit to drive one of said first or second windings only when the voltage across the other of said first and said second windings is at a predetermined level such that leakage inductance voltage induced into said one winding when said other winding is de-energized is less than said supply voltage and whereby that current spikes induced into said power source are reduced.

* * * * *